US011881370B2

(12) United States Patent
Dechamps

(10) Patent No.: US 11,881,370 B2
(45) Date of Patent: Jan. 23, 2024

(54) COMMUNICATION DEVICE FOR AN ELECTRICAL SWITCHING UNIT

(71) Applicant: Schneider Electric Industries SAS, Rueil Malmaison (FR)

(72) Inventor: Fabien Dechamps, Brie et Angonnes (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 121 days.

(21) Appl. No.: 17/482,615

(22) Filed: Sep. 23, 2021

(65) Prior Publication Data

US 2022/0102099 A1 Mar. 31, 2022

(30) Foreign Application Priority Data

Sep. 30, 2020 (FR) .................................. FR2009954

(51) Int. Cl.
*H01H 47/00* (2006.01)
*H01H 47/22* (2006.01)

(52) U.S. Cl.
CPC ........ *H01H 47/002* (2013.01); *H01H 47/226* (2013.01)

(58) Field of Classification Search
CPC ........................... H01H 47/002; H01H 47/226
USPC .......................................................... 361/139
See application file for complete search history.

(56) References Cited

U.S. PATENT DOCUMENTS 4,714,976 A 12/1987 Pin et al.
2013/0082634 A1 * 4/2013 Bokusky .................. G05B 9/02 318/563
2013/0249320 A1 9/2013 Lam
2018/0061604 A1 3/2018 Bordet et al.
2019/0007100 A1 * 1/2019 Yamashita .......... H04L 25/4902

FOREIGN PATENT DOCUMENTS

EP 0199612 A1 10/1986
EP 2403090 A2 * 1/2012 ............. H02H 1/066
EP 3288059 A1 2/2018
WO WO-2010014908 A1 * 2/2010 .......... F24F 11/0001

OTHER PUBLICATIONS

French Search Report and Written Opinion dated May 11, 2021 for corresponding French Patent Application No. 2009954, 6 pages.

* cited by examiner

*Primary Examiner* — Yemane Mehari
(74) *Attorney, Agent, or Firm* — Locke Lord LLP

(57) ABSTRACT

A communication device for an electrical switching unit that includes an actuator driven by a control circuit. The communication device includes: a connector that can be connected to the control circuit, to receive a state signal sent by the control circuit and to receive an electrical power supply voltage supplied by the switching unit; a capacitor configured to be recharged from the power supply voltage received from the input connector when the state signal takes a predefined value; a bistable relay comprising a normally-open electrical contact connected to output terminals to form a dry electrical contact; and a pulse generator supplied by the capacitor and being configured to excite the bistable relay when the capacitor reaches a predefined level of charge.

14 Claims, 5 Drawing Sheets

COMMUNICATION DEVICE FOR AN ELECTRICAL SWITCHING UNIT

TECHNICAL FIELD

The present invention especially relates to a communication device for a low-power-consumption electrical switching unit.

BACKGROUND

It is known to use electrical switching units, such as contactors, in electrical installations, for example to interrupt an electrical current.

In many applications, it is desirable to be able to remotely monitor the state of these switching units, for example for the purposes of monitoring or maintenance, or even to more rapidly detect a fault that has occurred in the installation.

However, many switching units of old design are not equipped to send their state to a remote location. Typically, information of the state of the unit is displayed locally by means of an indicator light. However, frequently no provision is made to transmit this information in another way, and especially by means of a dry electrical contact.

SUMMARY

It is these drawbacks that the invention is more particularly intended to remedy, by providing a communication device that can be associated with an existing electrical switching unit and that allows a state of said switching unit to be indicated by means of a dry electrical contact.

To this end, one aspect of the invention relates to a low-power-consumption communication device for an electrical switching unit, such as a contactor, said electrical switching unit comprising an actuator driven by a control circuit, the communication device comprising:

- a connector that can be connected to the control circuit, to receive a state signal sent by the control circuit and to receive an electrical power supply voltage supplied by the switching unit;
- a capacitor configured to be recharged from the power supply voltage received from the input connector when the state signal takes a predefined value;
- a bistable relay comprising a normally-open electrical contact connected to output terminals of the communication device to form a dry electrical contact;
- a pulse generator supplied by the capacitor and being configured to excite the bistable relay and thus switch the electrical contact when the capacitor reaches a predefined level of charge.

By virtue of the invention, the communication device allows information on the state of the switching unit to be supplied to a remote location by way of a dry electrical contact, which may be connected to one or more units, thus allowing the switching unit to be monitored remotely.

The communication device has a design that is simple and inexpensive to manufacture. It consumes only a very small amount of power to operate and has no need for a standalone electrical power source such as a battery.

According to some advantageous but non-mandatory aspects, such a communication device may incorporate one or more of the following features, implemented alone or in any technically permissible combination:

- The device comprises a current-limiting circuit connected between the input connector and the capacitor, said current-limiting circuit being configured to supply the capacitor from the received electrical power supply voltage solely when the state signal takes the predefined value.
- The relay comprises an additional electrical contact coupled to an output of the connector to send a signal indicating that the relay has changed state.
- The additional electrical contact is biased by the voltage supplied by the capacitor.
- The additional electrical contact is a normally-closed contact.
- The electrical power supply voltage supplied by the switching unit is lower than or equal to 15 volts.
- The electrical power consumed by the communication device during its operation is lower than 1 watt and preferably lower than 15 mW.
- The device comprises a reset button coupled to the relay and allowing the relay to be manually reset to a predefined state.
- The constituents of the communication device are housed in a casing configured to be mounted on a casing of the switching unit.
- The predefined level of charge of the capacitor corresponds to an electrical voltage comprised between 3 volts and 20 volts.

According to another aspect, the invention relates to a system comprising an electrical switching unit, such as a contactor, and a communication device such as defined above, said electrical switching unit comprising an actuator driven by a control circuit, the connector being connected to the control circuit, to receive a state signal sent by the control circuit and to receive an electrical power supply voltage supplied by the switching unit.

BRIEF DESCRIPTION OF THE DRAWINGS

The invention will be better understood and other advantages thereof will become more clearly apparent in the light of the following description of one embodiment of a communication device, which description is given merely by way of example and with reference to the appended drawings, in which.

DETAILED DESCRIPTION

Figure 1A:
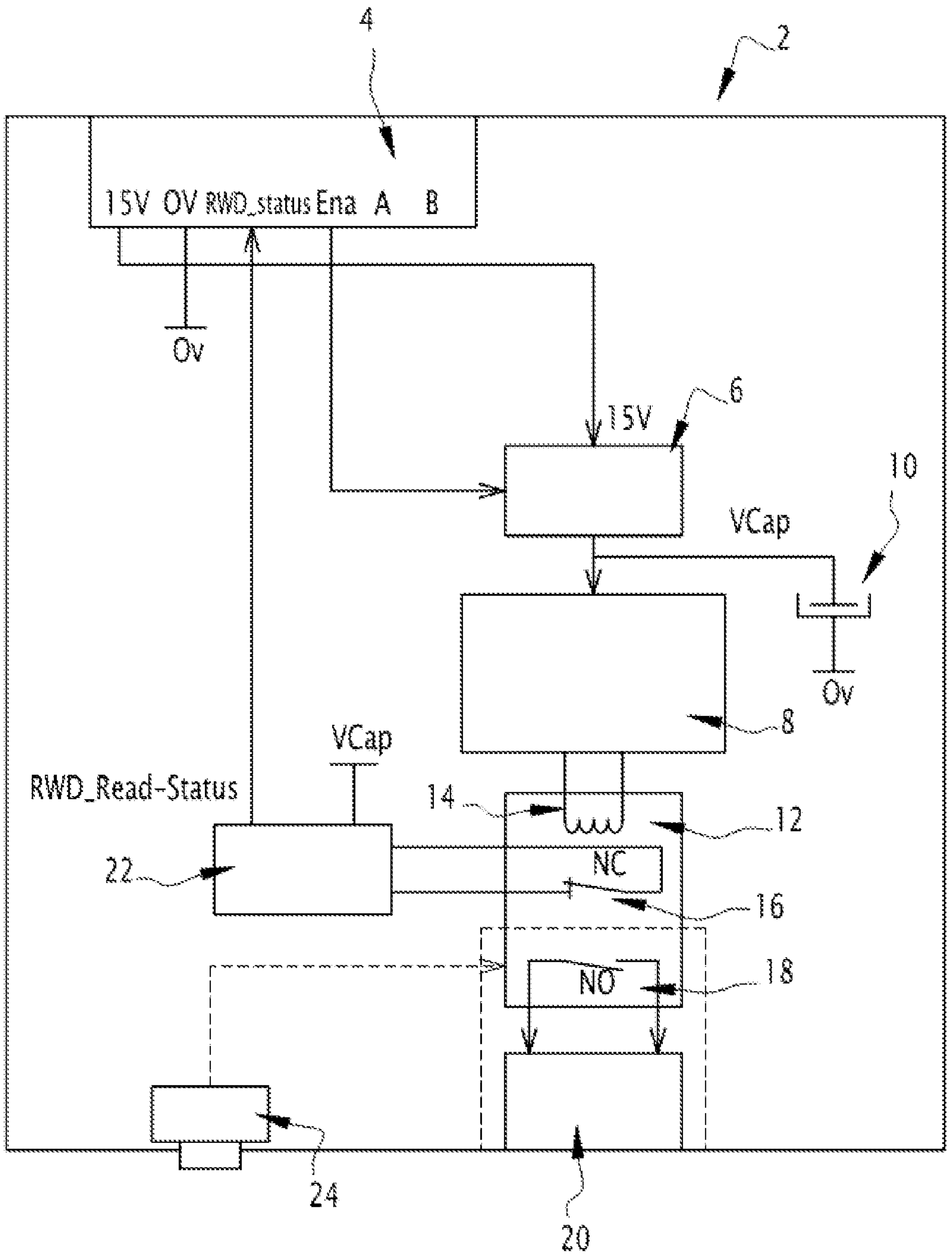
FIG. 1A schematically shows a communication device according to some embodiments of the invention.

FIG. 1A schematically shows a communication device 2.

The device 2 is especially intended to be associated with an electrical switching unit 1, such as a contactor.

Figure 1B:
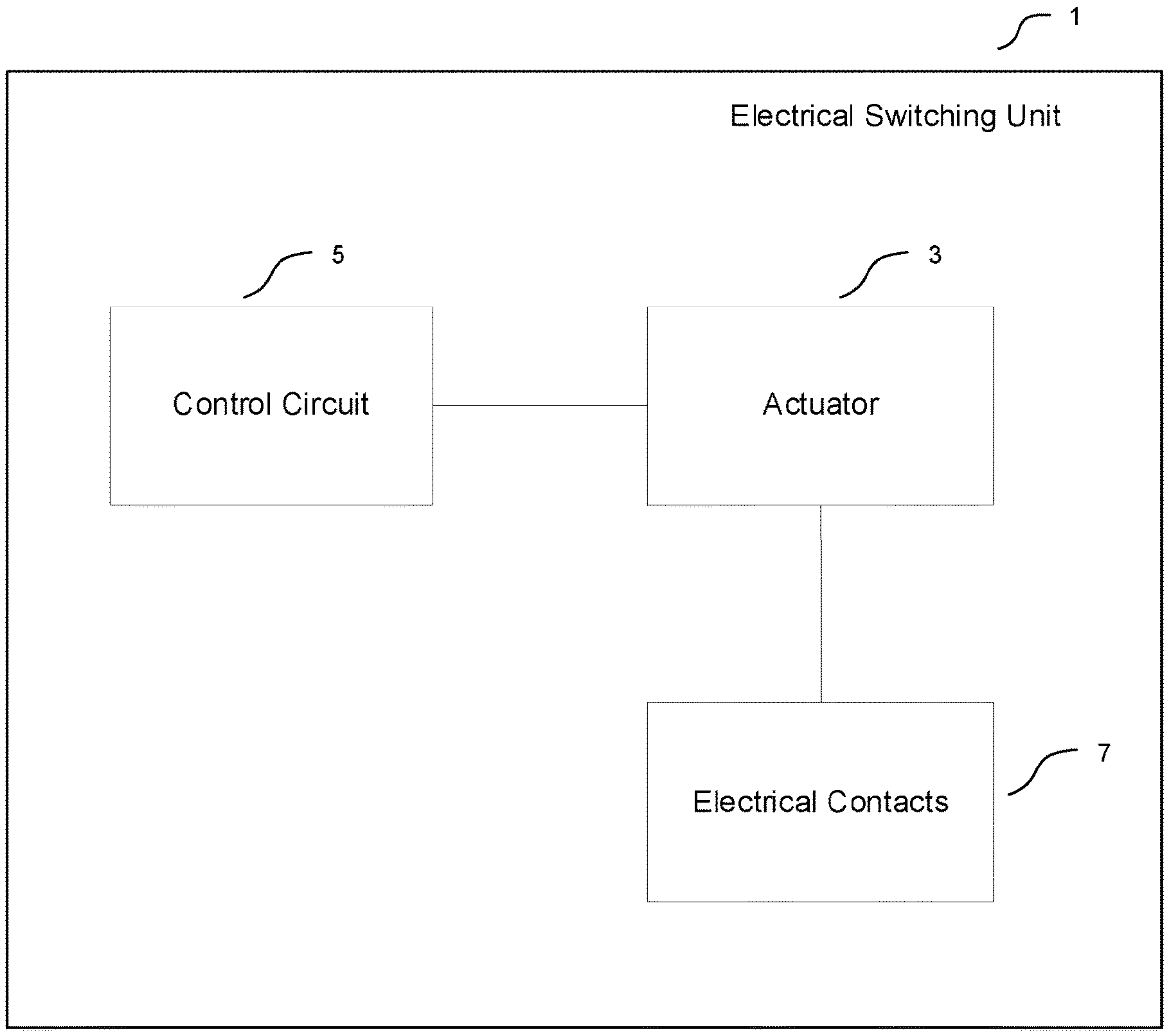
FIG. 1B schematically shows an exemplary electrical switching unit.

For example, as shown in FIG. 1B, the electrical switching unit 1 comprises an actuator 3 driven by a control circuit 5. The actuator 3 is coupled to electrical contacts 7 that are separable to switch the switching unit 1 between an electrically open state and an electrically closed state. The switching unit 1 may be installed in an electrical installation, such as an installation for distributing electricity.

The device 2 comprises a connector 4 that can be connected to the control circuit 5, to receive a state signal, denoted Ena, sent by the control circuit 5 and to receive an electrical power supply voltage supplied by the switching unit 1.

In the example of FIG. 1A, the electrical power supply voltage has been given the reference "15V". In the illustrated example, the connector 4 can also be connected to an electrical ground denoted "0V" and to data lines denoted A and B. These examples are non-limiting. It will in particular be understood that, despite the reference used to designate the electrical power supply voltage, the latter may take a value that is not necessarily equal to 15 volts.

For example, the state signal ENA may be sent by the switching unit to indicate an open state, or to indicate a fault.

The state signal ENA may be an electrical voltage of low amplitude, for example of maximum amplitude of 5 volts or 3.3 volts.

The state signal may take two values: a high value, here equal to the maximum amplitude, and a low value, at which the voltage is here zero. These examples are non-limiting.

The device 2 also comprises:

a current-limiting circuit 6 connected to the connector 4 to receive the power supply voltage and the state signal;

a capacitor 10 connected to the output of the current-limiting circuit 6;

a pulse generator 8 supplied by the capacitor;

a bistable relay 12.

The current-limiting circuit 6 is configured to supply the capacitor 10 from the received electrical power supply voltage, solely when the state signal takes a predefined value.

The predefined value may be a value chosen by a user or by the manufacturer of the device 2 depending on characteristics of the received power supply voltage, or more generally, on characteristics of the switching unit.

In other words, the capacitor 10 is configured to be recharged from the power supply voltage received from the input connector when the state signal takes a predefined value, for example when the state signal takes the high value.

In many examples, the electrical power supply voltage supplied by the switching unit is lower than or equal to 15 volts DC. In practice, the electrical power consumed by the device 2 during its operation is lower than 1 W and preferably lower than 15 mW. The device 2 is then said to have a low power consumption.

The relay 12 comprises a coil 14, and a first electrical contact 16 and a second electrical contact 18 that are coupled to the coil 14.

In the illustrated example, the first electrical contact 16 is a normally-closed (NC) contact. The second electrical contact 18 is a normally-open (NO) contact.

According to variants, the first electrical contact 16 may be omitted.

The pulse generator 8 comprises an input connected to the current regulator 6 and to the capacitor 10, and an output connected to the coil 14.

The pulse generator 8 is configured to excite the bistable relay 12 and thus switch the electrical contact 18 when the capacitor reaches a predefined level of charge. In particular, when the capacitor 10 is sufficiently charged, the pulse generator 8 sends an electrical voltage pulse to the terminals of the coil 14 to excite the coil 14 and thus switch the relay 12.

Advantageously, the electrical contact 18 is connected to output terminals 20 of the communication device 2 to form a dry electrical contact.

The dry electrical contact may be connected to a remote unit, to collect information on the state of the switching unit. This connection may be achieved using wired connecting means, such as electrical cables.

In other words, the device 2 allows the state signal received from the switching unit to be relayed to another remote unit, by means of a dry electrical contact.

Advantageously, the electrical contact 16 is coupled to an output of the connector 4 to send a signal (denoted "RWD-read-status" in FIG. 1A) indicating that the relay 12 has changed state. This allows corresponding information to be delivered to the control circuit of the switching unit.

Preferably, the electrical contact 16 is biased by the electrical voltage Vcap supplied by the capacitor 10.

For example, the device 2 comprises a biasing circuit 22 that is connected to the electrical contact 16 and to an electrical supply rail connected to the output of the capacitor so as to capture the electrical voltage Vcap supplied by the capacitor 10. The output of the biasing circuit 22 is connected to a corresponding output (denoted RWD_status) of the connector 4, to which output is sent the signal (RWD-read-status) generated by the biasing circuit 22, indicating that the relay 12 has changed state.

Advantageously, the device 2 comprises a reset button 24 coupled to the relay 12 and allowing the relay 12 to be manually reset to a predefined state.

For example, the relay 12 comprises, by construction, a button or any other suitable input device allowing the relay to be reset to a predefined state set by the manufacturer. The button 24 is mechanically coupled to this input by a transmitting mechanism.

Thus, in case of failure, or during installation, the device 2 may be reset to a predefined state, for example a state in which the relay 12 is not excited.

Figure 2:
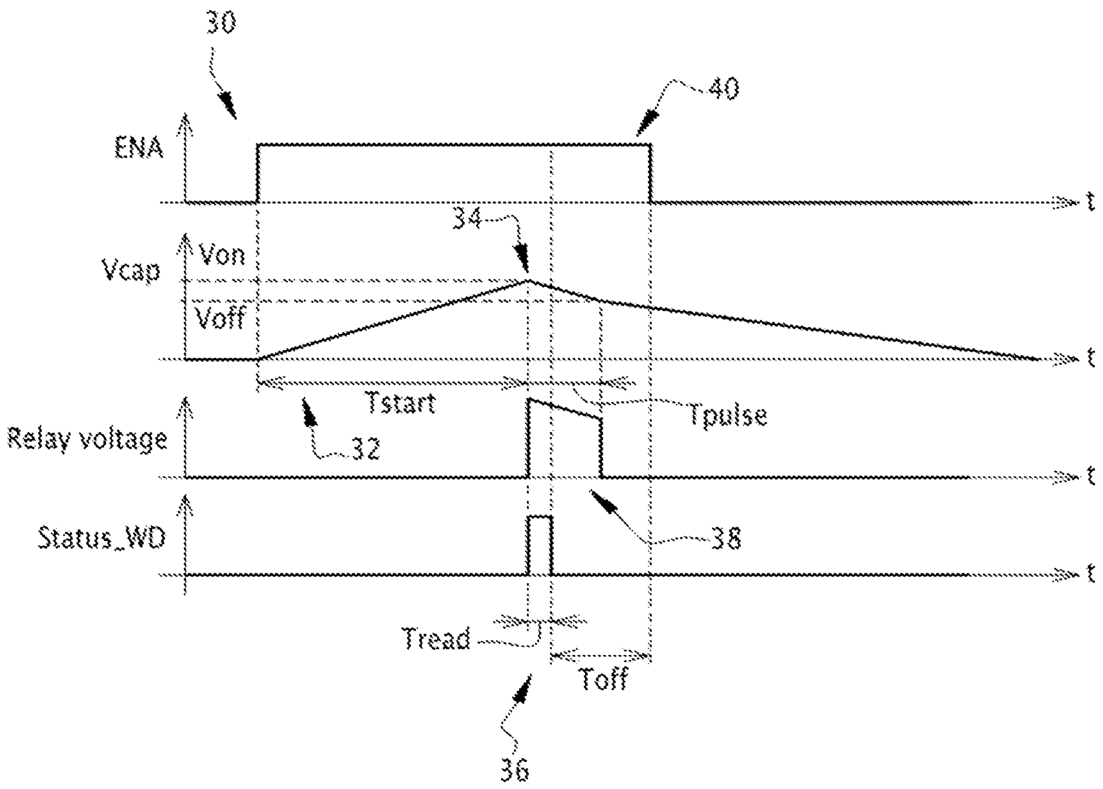
FIG. 2 schematically shows the variation in values of signals and of electrical voltages during the operation of the communication device of FIG. 1A.
Figure 4:
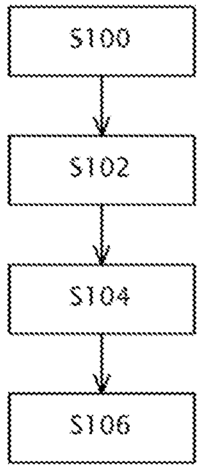
FIG. 4 is a chart illustrating operating steps of the communication device of FIG. 1A.

An example of operation of the device 2 is illustrated by virtue of FIGS. 2 and 4.

FIG. 2 shows a graph 30 schematically showing the variation in values of signals and of electrical voltages during the operation of the device 2 as a function of time (denoted "t" on the x-axis).

In particular, the graph 30 shows the variation in the state signal (ENA), in the voltage across the terminals of the capacitor 10 (which voltage is denoted Vcap), in the voltage pulse delivered by the pulse generator 8 (which voltage is denoted "Relay voltage") and in the signal (here denoted "Status_WD") indicating that the relay 12 has changed state.

FIG. 4 illustrates operating steps of the device 2.

Initially, the device 2 is connected to a switching unit. An input electrical voltage (for example present across the terminals 15V and 0V of the connector 4) is received from the switching unit. In contrast, the state signal remains at the low value.

In step S100, the state signal received from the connector 4 changes value, for example following a change of state of the switching unit, as shown in FIG. 2 (reference 32).

In response, in step S102, the current-limiting circuit 6 permits the capacitor 10 to charge. The voltage Vcap gradually increases, as the capacitor 10 charges.

In a step S104, the voltage Vcap across the terminals of the capacitor reaches the predefined level of charge, here corresponding to a trigger voltage Von (reference 34). This moment is for example reached at the end of a predefined time Tstart.

In response, the pulse generator 8 is activated and generates a voltage pulse from the energy stored in the capacitor 10 (reference 38). This gradually discharges the capacitor 10.

For example, the duration of the pulse (denoted Tpulse) may be set by programming the pulse generator 8 to stop when the level of charge of the capacitor 10 reaches a predefined second threshold.

In the illustrated example, this corresponds to a low voltage threshold denoted Voff. The low voltage threshold Voff is below the trigger voltage Von.

For example, the trigger voltage Von is equal to 13 V. The low voltage threshold Voff is equal to 8 volts. These examples are non-limiting and other values may be chosen depending on the circumstances. For example, the predefined level of charge of the capacitor corresponds to an electrical voltage comprised between 3 volts and 20 volts, or even between 5 volts and 20 volts.

The voltage pulse thus generated excites the coil 14 of the relay 12 and forces the contacts 16 and 18 to switch from their initial state. For example, the second electrical contact 18 is switched to its closed state, and the first electrical contact 16 is switched to an open state. Thus, the change of state may be detected by a remote unit connected to the dry contact formed by the terminals 20.

In parallel, advantageously, the biasing circuit 22 generates an output signal (reference 36) under the effect of the second contact 16 opening and by virtue of the electrical voltage Vcap, which is still being supplied by the capacitor 10.

In a step S106, the signal being received as input again changes state (reference 40). In response, the current-limiting circuit 6 ceases to supply the capacitor 10.

For example, the duration (denoted Tread) of this signal may be set depending on the mechanical characteristics of the relay 12.

Furthermore, in practice, the duration (denoted Toff) between the end of the output signal and the change of state of the state signal ENA received as input may be set depending on characteristics of the state signal ENA and/or on characteristics of the control circuit of the switching unit.

For example, the duration Toff may be chosen so as to generate a delay related to the fall of the state signal ENA (to its low value by default) once it is certain that the switching unit has actually changed state.

As a variant, the steps could be executed in a different order. Certain steps could be omitted. The described example does not prevent, in other embodiments, other steps from being implemented conjointly and/or sequentially with the described steps.

By virtue of the invention, the communication device 2 allows information on the state of the switching unit to which it is connected to be supplied to a remote location by way of a dry electrical contact, which may be connected to one or more units, thus allowing the switching unit to be monitored remotely.

The communication device has a design that is simple and inexpensive to manufacture. It consumes only a very small amount of power to operate and has no need for a stand-alone electrical power source such as a battery, since it is electrically supplied by the switching unit to which it is connected. Furthermore, by virtue of its low power consumption, the communication device is not detrimental to the correct operation of the switching unit and also does not degrade its power performance. Specifically, the switching unit is itself optimized in terms of power consumption and is not necessarily parameterized for such a task.

Advantageously, the use of the capacitor 10 to bias the second contact 16 allows the output signal RWS-read-status to be generated without consuming power directly from the switching unit.

The device 2 is furthermore independent of the switching unit and may thus, in certain numerous embodiments, be mounted on various existing switching units, without it being necessary to modify these units. However, the device 2 may equally well be used in many other applications; for example, it may be mounted on switching units intended to accommodate it, or be located remotely on a fastening rail in proximity to the switching unit when the latter is not intrinsically designed to accommodate the device 2.

Figure 3:
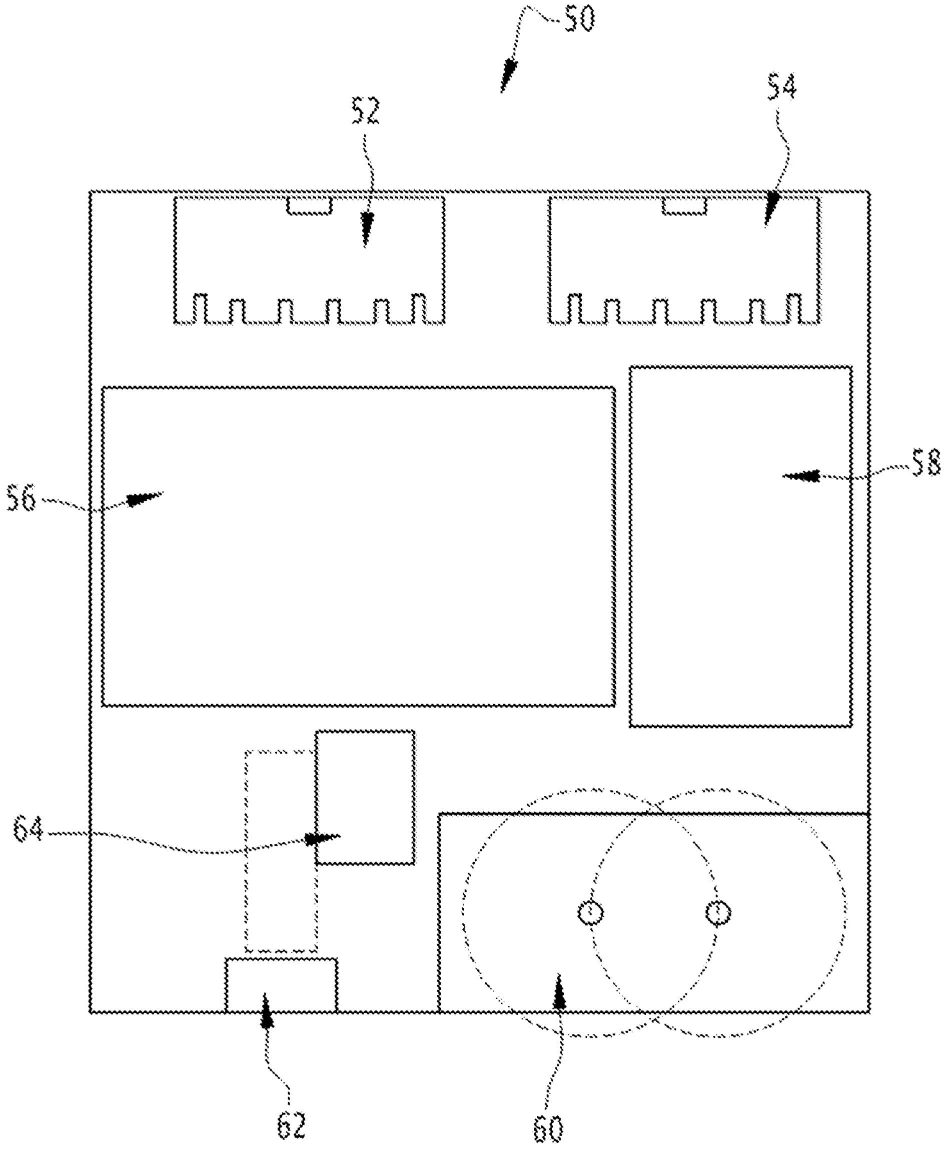
FIG. 3 shows the communication device of FIG. 1A seen via a view from above.

FIG. 3 shows an example of construction of the device 2.

Advantageously, the constituents of the device 2 are housed in a casing 50, which is for example made of thermoformed plastic.

The casing 50 is preferably configured to be mounted on the casing of the switching unit with which the device 2 is associated. For example, the casing 50 comprises fastening means, such as hooks, or screwable elements, or any suitable fastening device. As a variant, the casing 50 may be configured to be mounted in an electric switchboard, for example by being fastened or attached to a fastening rail, by virtue of suitable fastening elements.

The constituents of the device 2 may be mounted on a holder housed inside the casing 50, such as an epoxy-resin board, or any other equivalent device.

Preferably, the device 2 is assembled from discrete components.

In FIG. 3, the references 52, 56 and 58 correspond to the connector 4, to the relay 12 and to the current-limiting circuit 6, respectively. The references 60, 62 and 64 correspond to the output terminals 20, to the reset button 24 and to the biasing circuit 22, respectively.

An additional connector 54 may be installed in the case where the device 2 is intended to be connected to the switching unit by way of a wired link in a daisy-chain topology. The pins of the additional connector 54 are then connected to the respective pins of the connector 4.

Preferably, the device 2 has compact dimensions. For example, the casing 50 has a height smaller than or equal to 45 mm and a width smaller than or equal to 20 mm.

The embodiments and the variants envisaged above may be combined with one another so as to create new embodiments.

The invention claimed is:

1. A low-power-consumption communication device for an electrical switching unit, said electrical switching unit comprising an actuator driven by a control circuit, the communication device comprising:

- a connector that can be connected to the control circuit, to receive a state signal sent by the control circuit and to receive an electrical power supply voltage supplied by the switching unit;
- a capacitor configured to be recharged from the power supply voltage received from the input connector when the state signal takes a predefined value;
- a bistable relay comprising a normally-open electrical contact connected to output terminals of the communication device to form a dry electrical contact; and
- a pulse generator supplied by the capacitor and being configured to excite the bistable relay and thus switch the electrical contact when the capacitor reaches a predefined level of charge.

2. The communication device according to claim 1, further comprising a current-limiting circuit connected between the input connector and the capacitor, said current-limiting circuit being configured to supply the capacitor from the received electrical power supply voltage solely when the state signal takes the predefined value.

3. The communication device according to claim 1, wherein the relay comprises an additional electrical contact coupled to an output of the connector to send a signal indicating that the relay has changed state.

4. The communication device according to claim 3, wherein the additional electrical contact is biased by the voltage supplied by the capacitor.

5. The communication device according to claim 3, wherein the additional electrical contact is a normally-closed contact.

6. The communication device according to claim 1, wherein the electrical power supply voltage supplied by the switching unit is lower than or equal to 15 volts.

7. The communication device according to claim 1, wherein the electrical power consumed by the communication device during its operation is lower than 1 watt.

8. The communication device according to claim 1, further comprising a reset button coupled to the relay and allowing the relay to be manually reset to a predefined state.

9. The communication device according to claim 1, wherein constituents of the communication device are housed in a casing configured to be mounted on a casing of the switching unit.

10. The communication device according to claim 1, wherein the predefined level of charge of the capacitor corresponds to an electrical voltage comprised between 3 volts and 20 volts.

11. A system comprising an electrical switching unit, and a communication device according to claim 1, said electrical switching unit comprising an actuator driven by a control circuit, the connector being connected to the control circuit, to receive a state signal sent by the control circuit and to receive an electrical power supply voltage supplied by the switching unit.

12. The communication device according to claim 1, wherein the electrical switching unit comprises a contactor.

13. The communication device according to claim 7, wherein the electrical power consumed by the communication device during its operation is lower than 15 mW.

14. The system according to claim 11, wherein the electrical switching unit comprises a contactor.

* * * * *